United States Patent [19]

Millar

[11] Patent Number: 5,031,725

[45] Date of Patent: Jul. 16, 1991

[54] GEAR BOX IDLE LUBRICATION SYSTEM

[75] Inventor: Robert Millar, San Diego, Calif.

[73] Assignee: Sundstrand Corporation, Rockford, Ill.

[21] Appl. No.: 447,178

[22] Filed: Dec. 1, 1989

[51] Int. Cl.$^5$ .............................................. F01M 1/02
[52] U.S. Cl. .................... 184/6.12; 184/6.4; 184/27.2; 475/159
[58] Field of Search ............ 184/6.12, 6.4, 27.2, 184/31, 107, 108; 74/467; 475/159; 464/7

[56] References Cited

U.S. PATENT DOCUMENTS

| | | | |
|---|---|---|---|
| 2,012,579 | 8/1935 | Obayashi | 384/465 |
| 3,441,106 | 4/1969 | Taylor | 184/6.12 |
| 3,637,049 | 1/1972 | Butterfield et al. | 184/6.12 |
| 3,810,528 | 5/1974 | Morley | 184/6.12 |
| 4,431,372 | 2/1984 | Dadhich | 184/27.2 |
| 4,838,764 | 6/1989 | Murota | 184/31 |
| 4,841,803 | 6/1989 | Hamano | 74/467 |
| 4,848,177 | 7/1989 | Miura | 475/159 |

FOREIGN PATENT DOCUMENTS

| | | | |
|---|---|---|---|
| 0075195 | 4/1987 | Japan | 184/31 |
| 0127594 | 6/1987 | Japan | 184/6.12 |

Primary Examiner—Ira S. Lazarus
Assistant Examiner—A. Cariaso
Attorney, Agent, or Firm—Wood, Phillips, Mason, Recktenwald & VanSanten

[57] ABSTRACT

In order to provide lubrication of the bearings (16) and clutch (22) of an output shaft (14), even when the output shaft (14) is driven externally, a gear box (10) has a primary lubrication system (24) for circulating a lubricant (26) from a sump (28) into a lubricating flow path (30). The lubricating flow path (30) extends into and through a cavity (20) containing the bearings (16) and clutch (22) which support the output shaft (14) which is selectively operably interconnectable with a rotary input (12) and the primary lubrication system (24) is operable only with the rotary input (12). In addition to the primary lubrication system (24) for circulating the lubricant (26) from the sump (28) into the lubricating flow path (30), and to ensure lubrication whenever the output shaft (14) rotates, the output shaft (14) includes a pump (32) at one end of the lubricating flow path (30) to draw lubricant (26) from the sump (28) to lubricate the bearings (16) and clutch (22) and the pump (32) is adapted to return the lubricant (26) to the sump (28).

16 Claims, 2 Drawing Sheets

GEAR BOX IDLE LUBRICATION SYSTEM

FIELD OF THE INVENTION

The present invention is generally directed to a gear box lubrication system and, more particularly, to a lubrication system for lubricating an output shaft whenever the shaft is rotating.

BACKGROUND OF THE INVENTION

Typically, a gear box is adapted to receive a rotary input. This rotary input is generally delivered to an output shaft through a clutch arrangement or the like. Usually, the gear box is configured to have a housing surrounding the output shaft.

With this construction, the housing may typically form a portion of a lubricant reservoir disposed within the gear box. A hydraulic pump is usually provided to supply lubricant under pressure to the bearings and clutch that are associated with the output shaft whenever rotary input is being provided. However, when rotary input is shut down, no further lubricant is delivered by the pump to the bearings and the clutch of the output shaft.

In many cases, this can provide a significant problem with potential damage of an undesirable nature, e.g., the output shaft may well be coupled to a unit that continues to rotate as a result of inertia even when the rotary input is shut down. This means that the bearings and clutch will continue to be driven during such rotation but will not be lubricated in the process. Since the output shaft rotates in many such cases at a significant angular velocity, and the bearings and clutch receive no lubrication, they will eventually be damaged by reason of running in the absence of a lubricant.

The present invention is directed to overcoming the foregoing problems and accomplishing the resulting objects by providing a unique gear box lubrication system.

SUMMARY OF THE INVENTION

It is a principal object of the present invention to provide a gear box lubrication system for lubricating an output shaft whenever the shaft is rotating. It is also an object of the present invention to provide such a system wherein a primary lubrication arrangement operates whenever there is rotary input into the gear box and the output shaft is rotating to lubricate the bearings and clutch of an output shaft. It is a further object of the present invention to provide such a system wherein a secondary lubrication arrangement operates even when there is no rotary input into the gear box but the output shaft is rotating to lubricate the bearings and clutch of the output shaft. It is yet another object of the present invention to provide a pump associated with the output shaft as the secondary lubrication arrangement.

Accordingly, the present invention is directed to a gear box of the type having rotary input means and an output shaft supported by bearing means within a cavity having clutch means therein. The output shaft is selectively operably interconnectable with the rotary input means. The gear box has a primary lubrication system for circulating a lubricant from a lubricant sump or reservoir into a lubricating flow path in the cavity for lubricating the bearing means and clutch means. The primary lubrication system is operable only in conjunction with the rotary input means. In addition, the gear box includes means associated with the output shaft for circulating the lubricant from the lubricant sump or reservoir to the lubricating flow path.

More specifically, the lubricant circulating means is operable entirely independent of the primary lubrication system whenever the output shaft is rotating. The lubricant circulating means ensures lubrication of the bearing means and clutch means during rotation of the output shaft even when the rotary input means is idle. In a preferred embodiment, the lubricant circulating means includes pump means associated with the output shaft at one end of the lubricating flow path.

As for the pump means, it is preferably adapted to draw lubricant from the lubricant sump or reservoir for circulation through the lubricating flow path. The pump means is adapted to circulate the lubricant through the bearing means and the clutch means and to return the lubricant to the lubricant sump or reservoir, and it includes a radially extending disk having a plurality of vanes thereon wherein the lubricating flow path extends axially along the output shaft and radially adjacent thereto to the disk and then radially outward along the disk. With this arrangement, the lubricant flow path then extends axially along the output shaft and radially outwardly thereof away from the disk.

In an exemplary embodiment, the clutch means includes a one-way clutch and the bearing means includes at least a pair of bearings. The pair of bearings journal the output shaft for rotation about a rotational axis within the cavity. Further, the one-way clutch is preferably adapted to operably interconnect the output shaft to the rotary input means through a clutch pack assembly.

As for the primary lubrication system, it preferably includes a pump operably interconnected to the rotary input means. It also includes a passage for the lubricant leading from the lubricant sump to the lubricating flow path. With this arrangement, the pump is adapted to circulate the lubricant from the lubricant sump through the passage into the lubricating flow path.

Advantageously, the lubricant sump or reservoir substantially entirely surrounds the cavity and the output shaft and is filled with the lubricant preferably to a level approximating the rotational axis of the output shaft. In addition, at least one supply passage advantageously leads from the lubricant sump or reservoir to the lubricating flow path at a point below the level of the lubricant.

Additional details of the lubricating flow path include a lubricant accumulation chamber provided at one end of the cavity. A pair of radially spaced supply passages preferably lead from the lubricant sump to the lubricant accumulation chamber at a point below the level of the lubricant. Further, the lubricating flow path may include an axial lubricating segment through the bearing means and the clutch means and an axial return segment.

Preferably, the axial return segment of the lubricating flow path is spaced radially outwardly of the axial lubrication segment. The lubricant is then adapted to flow from the lubricant sump or reservoir to the lubricant accumulation chamber through the radially spaced supply passages. Thereafter, the lubricant is adapted to flow through the remainder of the lubricating flow path back to the lubricant accumulation chamber.

In addition, at least one return passage advantageously leads from the lubricant accumulation chamber to the lubricant sump or reservoir. The lubricant is preferably adapted to flow from the lubricant sump or reservoir through the supply passages into the lubricant accumulation chamber for circulation through the remainder of the lubricating flow path. With this arrangement, the lubricant is also advantageously adapted to flow from the lubricant accumulation chamber through the return passage back into the lubricant sump or reservoir.

Still other objects, advantages and features of the present invention will become apparent from a consideration of the following specification taken in conjunction with the accompanying drawings.

DETAILED DESCRIPTION OF THE PREFERRED EMBODIMENT

Figure 1:
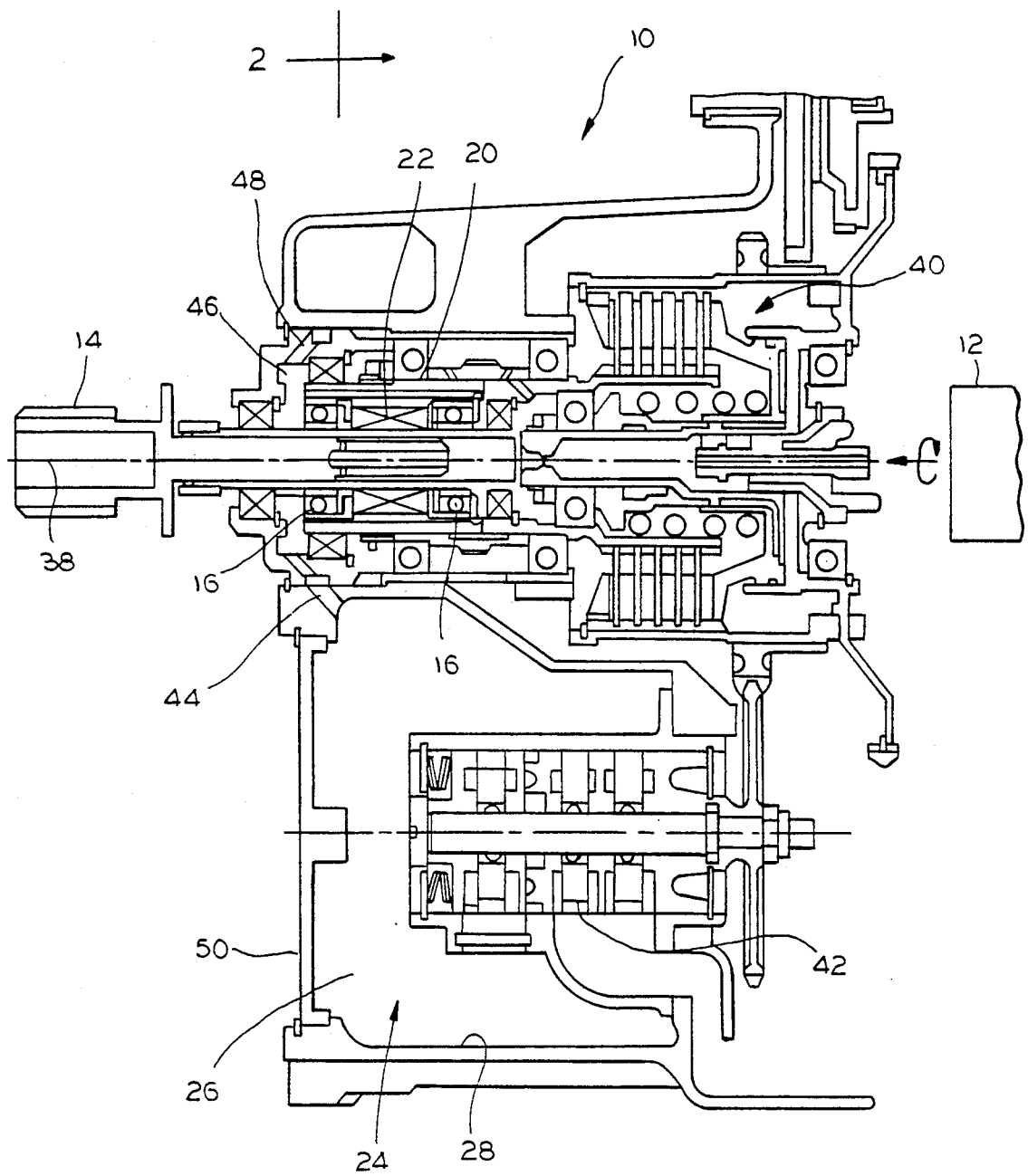
FIG. 1 is a cross sectional view illustrating the gear box lubrication system of the present invention.

Referring to the drawings, and first to FIG. 1, the reference numeral 10 designates generally a gear box of the type having rotary input means 12 and an output shaft 14 supported by bearing means 16 within a cavity 20 having clutch means 22 therein. The output shaft 14 is selectively operably interconnectable with the rotary input means 12. The gear box 10 has a primary lubrication arrangement generally designated 24 for circulating a lubricant 26 from a lubricant sump or reservoir 28 into a lubricating flow path 30 in the cavity 20 for lubricating the bearing means 16 and clutch means 22. The primary lubrication arrangement 24 is operable only in conjunction with the rotary input means 12. With this construction, the gear box 10 also includes means associated with the output shaft 14 for circulating the lubricant 26 from the lubricant sump 28 to the lubricating flow path 30 to form a secondary lubrication arrangement.

More specifically, the lubricant circulating means is operable entirely independent of the primary lubrication system 24 whenever the output shaft 14 is rotating. The lubricant circulating means ensures lubrication of the bearing means 16 and clutch means 22 during rotation of the output shaft 14 even when the rotary input means 12 is idle. Still more specifically, the lubricant circulating means includes pump means 32 associated with the output shaft 14 at one end of the lubricating flow path 30.

Figure 1A:
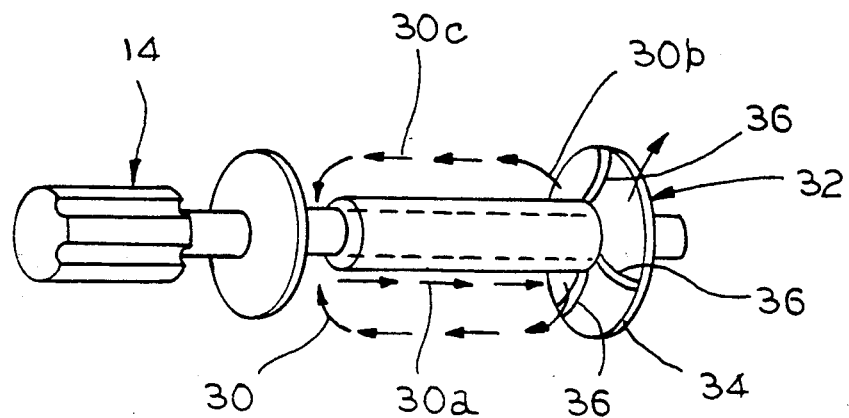
FIG. 1a is a perspective view of an output shaft/pump arrangement in accordance with the present invention.

As best shown in FIG. 1a, the pump means 32 is adapted to circulate the lubricant 26 through the bearing means 16 and clutch means 22 and to return the lubricant 26 to the lubricant sump 28 (see, also, FIG. 1). The pump means 32 includes a radially extending disk 34 having a plurality of vanes 36 thereon and the lubricating flow path 30 extends axially along and radially adjacent the output shaft 14 as at 30a to the disk 34 and then radially outward as at 30b along the disk 34. From that point, the lubricating flow path 30 next extends axially along and radially outwardly of the output shaft 14 as at 30c away from the disk 34.

Preferably, the clutch means 22 comprises a one-way clutch and the bearing means 16 includes at least a pair of bearings 16 which journal the output shaft 14 for rotation. It will be appreciated that the output shaft 14 is journaled for rotation about a rotational axis 38 (see FIG. 1) within the cavity 20. With this arrangement, the one-way clutch 22 is adapted to operably interconnect the output shaft 14 to the rotary input means 12 through a conventional clutch pack assembly 40.

Still referring to FIG. 1, the primary lubrication system 24 includes a pump 42 operably interconnected to the rotary input means 12. It also includes at least one and preferably a pair of passages 44 (see FIG. 2) for the lubricant 26 leading from the lubricant sump 28 to the lubricating flow path 30. As will be appreciated, the pump 42 is adapted to circulate the lubricant 26 from the lubricant sump 28 through the passages 44 into the lubricating flow path 30.

Figure 2:
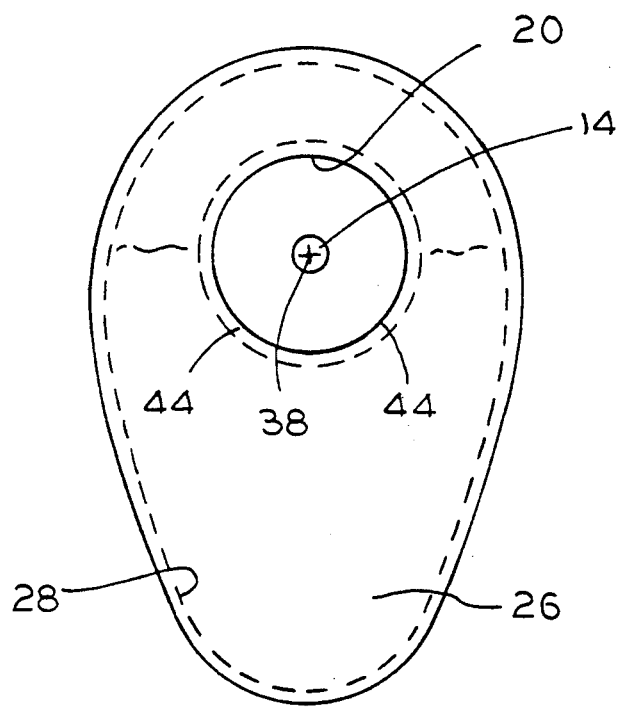
FIG. 2 is a cross sectional view taken generally on the line 2—2 of FIG. 1 with components surrounding the output shaft removed.

As best shown in FIG. 2, the lubricant sump 28 substantially entirely surrounds the cavity 20 and the output shaft 14 and is filled with the lubricant 26 to a level approximating the rotational axis 38 of the output shaft 14. As shown, the supply passages 44 lead from the lubricant sump 28 to the lubricating flow path 30 at a point below the level of the lubricant 26, i.e., below the rotational axis 38 of the output shaft 14.

Referring to FIG. 1, the lubricating flow path 30 includes a lubricant accumulation chamber 46 at one end of the cavity 20. The pair of radially spaced supply passages 44 lead from the lubricant sump 28 to the lubricant accumulation chamber 46 at a point below the level of the lubricant 26. As previously suggested, the lubricating flow path 30 includes an axial lubricating segment 30a through the bearings 16 and the one-way clutch 22 and an axial return segment 30c.

As will be appreciated, the axial return segment 30c of the lubricating flow path 30 is spaced radially outwardly of the axial lubricating segment 30a. The lubricant 26 is adapted to flow from the liquid sump 28 to the lubricant accumulation chamber 46 through the radially spaced supply passages 44. Thereafter, the lubricant 26 is adapted to flow through the remainder of the lubricating flow path 30 back to the lubricant accumulation chamber 46.

In the illustrated embodiment of the invention, at least one return passage 48 leads from the lubricant accumulation chamber 46 to the lubricant sump 28. The lubricant 26 is adapted to flow from the lubricant sump 28 through the supply passages 44 and into the lubricant accumulation chamber 46 for circulation through the remainder of the previously described lubricating flow path 30. Still additionally, the lubricant 26 is adapted to flow from the lubricant accumulation chamber 46 through the return passage 48 back into the lubricant sump 28.

As will now be appreciated, the present invention is directed to a lubrication system for a gear box 10 having an output shaft 14 connected via an overrunning or one-way clutch 22 to a clutch pack assembly 40 which may be engaged to couple the output shaft 14 to rotary input means 12. The gear box 10 includes the lubricating pump 42 which is driven on the input side to provide lubricant 26 to the bearings 16 journaling the output shaft 14 and to the overrunning or one-way clutch 22. However, when there is no rotary input, the lubricating pump 42 is no longer operated with the result that it cannot provide lubricant 26 to the bearings 16 and the overrunning or one-way clutch 22 should the load on the output shaft 14 continue to rotate as a result of inertia.

As a result, the gear box includes a housing 50 defining at least in part an enlarged lubricant sump or reservoir 28 which has a level of lubricant 26 approaching the rotational axis 38 of the output shaft 14. The supply passages or ports 44 positioned below this level extend to the reservoir or sump 28 and to the vicinity of the bearings 16 and the overrunning or one-way clutch 22, i.e., into the lubricant accumulation chamber 46. The output shaft 14 carries the disk 34 which extends to either side of the rotational axis 38. The disk 34 is provided with vanes 36 which serve together serve as a slinger pump having its lower periphery bathed in lubricant 26 from the sump 28. With this arrangement, inertial driving of the output shaft 14 by the load will cause the pump 34 to be driven to pump lubricant 26 about the bearings 16 and the overrunning or one-way clutch 22 to assure lubrication of those components.

While in the foregoing there has been set forth a preferred embodiment of the invention, it will be appreciated that the details herein given may be varied without departing from the true spirit and scope of the appended claims.

I claim:

1. In a gear box of the type having rotary input means and an output shaft, said output shaft being supported by bearing means within a cavity having clutch means therein whereby said output shaft is selectively operably interconnectable with said rotary input means, said gear box having a primary lubrication system for circulating a lubricant from a lubricant sump into a lubricating flow path in said cavity for lubricating said bearing means and clutch means, said primary lubrication system being operable only with said rotary input means, the improvement comprising:

said primary lubrication system including a pump operably interconnected to said rotary input means and including a passage for said lubricant, said passage leading from said lubricant sump to said lubricating flow path, said pump being adapted to circulate said lubricant from said lubricant sump through said passage into said lubricating flow path; and separate lubricant circulating means associated with said output shaft for circulating said lubricant from said lubricant sump to said lubricating flow path, said separate lubricant circulating means being operable whenever said output shaft is rotating, said separate lubricant circulating means ensuring lubrication of said bearing means and clutch means during rotation of said output shaft even when said rotary input means is idle.

2. The gear box of claim 1 wherein said clutch means includes a one-way clutch and said bearing means includes at least a pair of bearings, said pair of bearings journaling said output shaft for rotation about a rotational axis within said cavity, said one-way clutch being adapted to operably interconnect said output shaft to said rotary input means through a clutch pack assembly.

3. The gear box of claim 1 wherein said lubricant sump substantially surrounds said cavity and said output shaft, said lubricant sump being filled with said lubricant to a level approximating a rotational axis of said output shaft, and including at least one supply passage leading from said lubricant sump to said lubricating flow path at a point below said level of said lubricant.

4. The gear box of claim 3 wherein said lubricating flow path includes a lubricant accumulation chamber at one end of said cavity, and including a pair of radially spaced supply passages leading from said lubricant sump to said lubricant accumulation chamber at a point below said level of said lubricant, said lubricating flow path including an axial lubricating segment through said bearing means and said clutch means and an axial return segment.

5. The gear box of claim 4 wherein said axial return segment of said lubricant flow path is spaced radially outwardly of said axial lubricating segment, said lubricant being adapted to flow from said liquid sump to said lubricant accumulation chamber through said radially spaced supply passages, said lubricant thereafter being adapted to flow through the remainder of said lubricating flow path back to said lubricant accumulation chamber.

6. The gear box of claim 5 including at least one return passage leading from said lubricant accumulation chamber to said lubricant sump, said lubricant being adapted to flow from said liquid sump through said supply passages into said lubricant accumulation chamber for circulation through the remainder of said lubricating flow path, said lubricant also being adapted to flow from said lubricant accumulation chamber through said return passage back into said liquid sump.

7. The gear box of claim 1 wherein said lubricant circulating means includes pump means associated with said output shaft at one end of said lubricating flow path, said pump means being adapted to draw lubricant from said lubricant sump for circulation through said lubricating flow path, said pump means being adapted to circulate said lubricant through said bearing means and said clutch means and to return said lubricant to said lubricant sump.

8. The gear box of claim 7 wherein said pump means includes a radially extending disk having a plurality of vanes thereon, said lubricating flow path extending axially along and radially adjacent said output shaft to said disk and then radially outward along said disk, said lubricating flow path then extending axially along and radially outwardly of said output shaft away from said disk.

9. In a gear box of the type having rotary input means and an output shaft, said output shaft being supported by bearing means within a cavity having clutch means therein whereby said output shaft is selectively operably interconnectable with said rotary input means, said gear box having a primary lubrication system for circulating a lubricant from a lubricant sump into a lubricating flow path in said cavity for lubricating said bearing means and clutch means, said primary lubrication system being operable only with said rotary input means, the improvement comprising:

said primary lubrication system including a pump operably interconnected to said rotary input means and including a passage for said lubricant, said passage leading from said lubricant sump to said lubricating flow path, said pump being adapted to circulate said lubricant from said lubricant sump through said passage into said lubricating flow path; and separate lubricant circulating means associated with said output shaft for circulating said lubricant from said lubricant sump to said lubricating flow path, said separate lubricant circulating means being operable whenever said output shaft is rotating, said separate lubricant circulating means ensuring lubrication of said bearing means and clutch means during rotation of said output shaft even when said rotary input means is idle;

said lubricant sump substantially surrounding said cavity and said output shaft and being filled with said lubricant, said lubricant being maintained at a level approximating a rotational axis of said output shaft, and including at least one supply passage leading from said lubricant sump to said lubricating flow path at a point below said level of said lubricant;

said separate lubricant circulating means including pump means associated with said output shaft at one end of said lubricating flow path, said pump means being adapted to draw lubricant from said lubricant sump for circulation through said lubricating flow path, said pump means being adapted to circulate said lubricant through said bearing means and said clutch means and to return said lubricant to said lubricant sump.

10. The gear box of claim 9 wherein said clutch means includes a one-way clutch and said bearing means includes at least a pair of bearings, said pair of bearings journaling said output shaft for rotation about a rotational axis within said cavity, said one-way clutch being adapted to operably interconnect said output shaft to said rotary input means through a clutch pack assembly.

11. The gear box of claim 9 wherein said lubricating flow path includes a lubricant accumulation chamber at one end of said cavity, and including a pair of radially spaced supply passages leading from said lubricant sump to said lubricant accumulation chamber at a point below said level of said lubricant, said lubricating flow path including an axial lubricating segment through said bearing means and said clutch means and an axial return segment.

12. The gear box of claim 11 wherein said axial return segment of said lubricant flow path is spaced radially outwardly of said axial lubricating segment, said lubricant being adapted to flow from said liquid sump to said lubricant accumulation chamber through said radially spaced supply passages, said lubricant thereafter being adapted to flow through the remainder of said lubricating flow path back to said lubricant accumulation chamber.

13. The gear box of claim 12 including at least one return passage leading from said lubricant accumulation chamber to said lubricant sump, said lubricant being adapted to flow from said liquid sump through said supply passages into said lubricant accumulation chamber for circulation through the remainder of said lubricating flow path, said lubricant also being adapted to flow from said lubricant accumulation chamber through said return passage back into said liquid sump.

14. In a gear box of the type having rotary input means and an output shaft, said output shaft being supported by bearing means within a cavity having clutch means therein whereby said output shaft is selectively operably interconnectable with said rotary input means, said gear box having a primary lubrication system for circulating a lubricant from a lubricant sump into a lubricating flow path in said cavity for lubricating said bearing means and clutch means, said primary lubrication system being operable only with said rotary input means, the improvement comprising:

said primary lubrication system including a pump operably interconnected to said rotary input means and including a passage for said lubricant, said lubricant leading from said lubricant sump to said lubricating flow path, said pump being adapted to circulate said lubricant from said lubricant sump through said passage into said lubricating flow path; and separate lubricant circulating means associated with said output shaft for circulating said lubricant from said lubricant sump to said lubricating flow path, said separate lubricant circulating means being operable whenever said output shaft is rotating, said separate lubricant circulating means ensuring lubrication of said bearing means and clutch means during rotation of said output shaft even when said rotary input means is idle;

said clutch means including a one-way clutch and said bearing means including at least a pair of bearings, said pair of bearings journaling said output shaft for rotation about a rotational axis within said cavity, said one-way clutch being adapted to operably interconnect said output shaft to said rotary input means through a clutch pack assembly;

said lubricant sump substantially surrounding said cavity and said output shaft and being filled with said lubricant, said lubricant being maintained at a level approximating a rotational axis of said output shaft, and including at least one supply passage leading from said lubricant sump to said lubricating flow path at a point below said level of said lubricant;

said separate lubricant circulating means including pump means associated with said output shaft at one end of said lubricating flow path, said pump means being adapted to draw lubricant from said lubricant sump for circulation through said lubricating flow path, said pump means being adapted to circulate said lubricant through said bearings and said one-way clutch and to return said lubricant to said lubricant sump;

said lubricating flow path including a lubricant accumulation chamber at one end of said cavity and including a pair of radially spaced supply passages, said supply passages leading from said lubricant sump to said lubricant accumulation chamber at a point below said level of said lubricant, said lubricating flow path including an axial lubricating segment through said bearing means and said clutch means and an axial return segment.

15. The gear box of claim 14 wherein said axial return segment of said lubricant flow path is spaced radially outwardly of said axial lubricating segment, said lubricant being adapted to flow from said liquid sump to said lubricant accumulation chamber through said radially spaced supply passages, said lubricant thereafter being adapted to flow through the remainder of said lubricating flow path back to said lubricant accumulation chamber.

16. The gear box of claim 15 including at least one return passage leading from said lubricant accumulation chamber to said lubricant sump, said lubricant being adapted to flow from said liquid sump through said supply passages into said lubricant accumulation chamber for circulation through the remainder of said lubricating flow path, said lubricant also being adapted to flow from said lubricant accumulation chamber through said return passage back into said liquid sump.

* * * * *